United States Patent [19]  
Price et al.

[11] Patent Number: 4,550,810  
[45] Date of Patent: Nov. 5, 1985

[54] DISC BRAKES FOR VEHICLES

[75] Inventors: Anthony G. Price, Gwent, Wales; Roy Campbell, Worcestershire, England

[73] Assignee: Lucas Industries public limited company, England

[21] Appl. No.: 553,759

[22] Filed: Nov. 21, 1983

[30] Foreign Application Priority Data

Nov. 25, 1982 [GB] United Kingdom ............... 8233692

[51] Int. Cl.⁴ .................... F16D 55/39; F16D 55/40
[52] U.S. Cl. ............................ 188/71.4; 188/71.5; 188/72.6; 188/72.7; 188/106 F; 192/93 R
[58] Field of Search ............... 188/70 R, 70 B, 71.4, 188/71.5, 72.2, 72.6, 72.7, 72.9, 206 A, 106 F; 192/93 R, 93 C

[56] References Cited

U.S. PATENT DOCUMENTS

| | | | |
|---|---|---|---|
| 2,526,143 | 10/1950 | Lambert | 192/93 R X |
| 2,620,910 | 12/1952 | Stone | 192/93 R |
| 3,237,724 | 3/1966 | Kershner et al. | 188/71.5 |
| 3,952,843 | 4/1976 | Campbell et al. | 188/72.7 X |
| 3,991,859 | 11/1976 | Coulter et al. | 188/72.7 X |

FOREIGN PATENT DOCUMENTS

| | | | |
|---|---|---|---|
| 52-68673 | 6/1977 | Japan | 188/72.7 |
| 55-33955 | 3/1980 | Japan | 188/72.7 |
| 938950 | 10/1963 | United Kingdom | |

Primary Examiner—Bruce H. Stoner, Jr.  
Assistant Examiner—Richard R. Diefendorf  
Attorney, Agent, or Firm—Laff, Whitesel, Conte & Saret

[57] ABSTRACT

A disc brake, particularly suitable for use in tractors and like vehicles, is disclosed. Balls are located in complementary inclined recesses in a pressure plate and in an adjacent end wall of the brake housing. The brake is actuated by radial movement of the pressure plate, which produces a camming effect as the balls tend to ride out of the recesses, so that the pressure plate moves axially to urge a rotatable friction disc into engagement with a surface of the housing. Pilot pins engage with lugs on the pressure plate, constraining it against angular movement, so that when on application of the brake the pressure plate engages the friction disc, the pressure plate is prevented from being carried round with the friction disc, ensuring that no servo effect takes place.

12 Claims, 9 Drawing Figures

DISC BRAKES FOR VEHICLES

This invention relates to disc brakes for vehicles of the kind in which at least one friction disc rotatable within a stationary housing is adapted to be moved into engagement with a relatively stationary surface, and actuating means is provided for moving the disc into engagement with the said surface to apply the brake, the actuating means comprising at least one pressure plate, and camming means co-operating with the pressure plate and a reaction member, actuating movement of the pressure plate relative to the reaction member in the plate of the pressure plate causing a camming effect to be produced so that the pressure plate moves axially to urge the friction disc into engagement with the stationary surface.

A brake of that kind is referred to below as "a brake of the kind set forth" and is particularly suitable for use in tractors and like vehicles.

In known brakes of the kind set forth, the application of the brake can be initiated by moving the pressure plate angularly, or radially, and in each case, upon engagement of the pressure plate with the friction disc, the pressure plate will be carried round with the friction disc to produce a servo action causing the camming effect to be increased whereby to enhance the axial component of the brake-applying movement.

According to our invention in a disc brake of the kind set forth the reaction member is non-rotatable, means is provided for producing radial movement of the pressure plate relative to the reaction member in order to actuate the brake, and further means is provided for constraining the pressure plate against angular movement, the said further means being constructed and arranged to permit radial and axial movement of the pressure plate during operation of the brake.

Conveniently, the said further means comprises pilots, suitably pins or lugs engaging with edges of lugs on the pressure plate, the edges of the lugs being aligned with the direction of the radial movement of the pressure plate relative to the reaction member.

The camming means may comprise balls or rollers located in complementary sets of recesses in adjacent faces of the pressure plate and the reaction member and, preferably, the reaction member comprises an end wall of the housing.

The invention therefore provides a simple and relatively inexpensive brake mechanism which has a very compact, sturdy construction, employing a minimum number of component parts.

The brake is also extremely easy to install, it being a relatively simple operation to drill the required recesses in the said end wall of the housing.

Constraining the pressure plate against angular movement ensures that no servo effect occurs when the brake is applied, so that the performance of the brake is stable and is equally effective for both directions of disc rotation. It also provides the brake with a substantially constant velocity ratio throughout the wear life of fraction linings carried by the disc, and articulation between forward and reverse braking is eliminated so that there is no force tending to oppose or "fight" the brake-applying force.

Application of the brake requires a relatively low product of input travel and effort (P.V.), and the loss of performance due to elimination of the servo effect can be compensated for by providing friction linings having a high coefficient of friction.

In a preferred arrangement the radial movement of the pressure plate can be effected hydraulically for normal service braking by means of an hydraulic piston and cylinder assembly, and can be effected mechanically for parking or emergency braking by means of any suitable mechanical linkage.

The brake of the present invention may be of the "dry" or "oil-immersed" type. In the former case, depending upon the duty the brake has to perform, only a single friction disc need be provided. In the latter case, a plurality of rotatable axially movable friction discs may be provided with the rotatable discs interposed in a stack with non-rotatable axially movable friction discs.

Two embodiments of the invention will now be described by way of example with reference to the accompanying drawings, in which.

Figure 1:
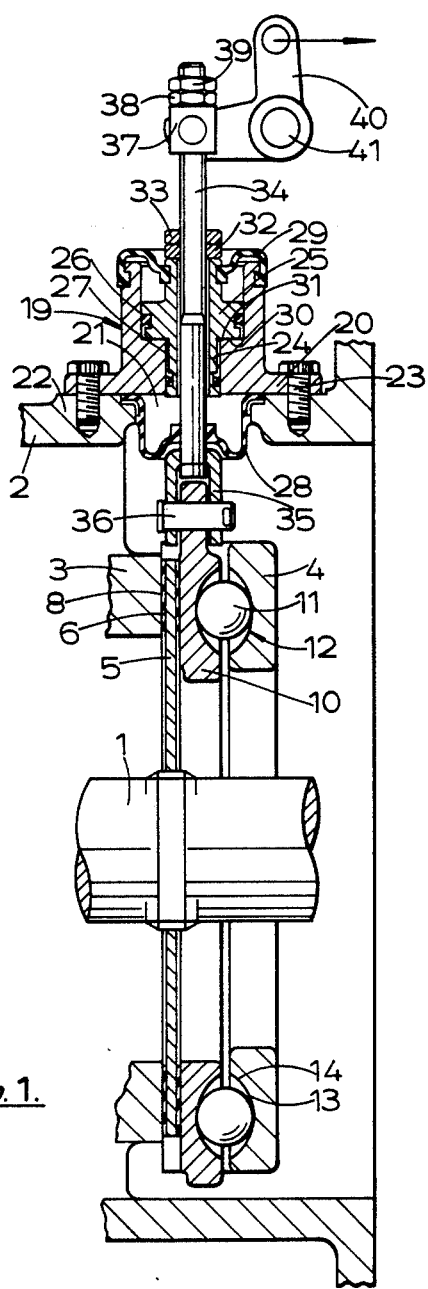
FIG. 1 is a longitudinal section through a disc brake.
Figure 2:
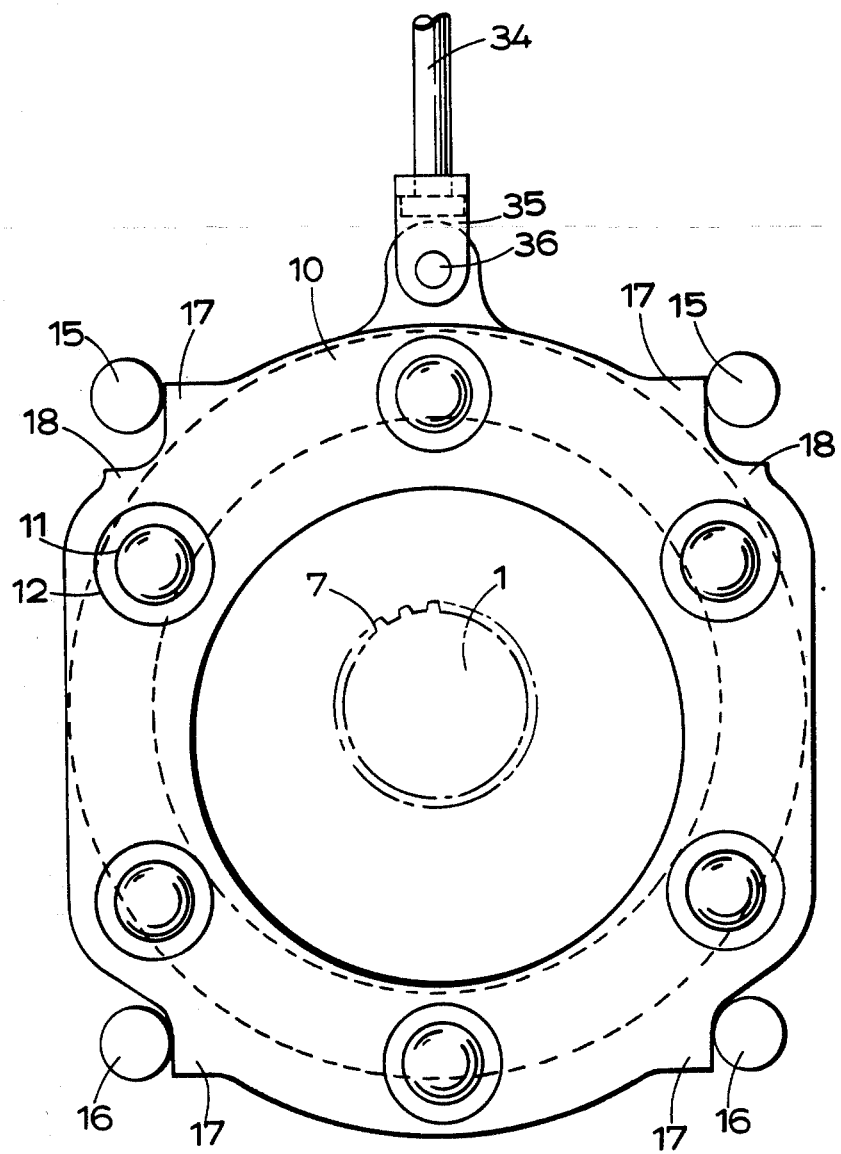
FIG. 2 is a plan view showing the pressure plate incorporated in the brake of FIG. 1.
Figure 3:
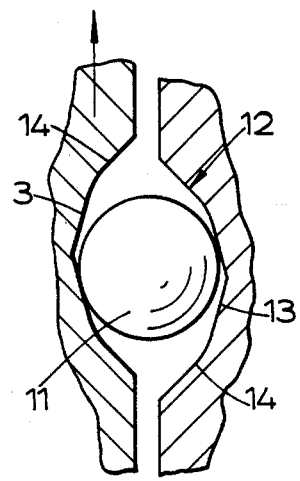
FIG. 3 is an enlarged longitudinal section through a ball and ramp mechanism incorporated in the brake of FIGS. 1 and 2.
Figure 4:
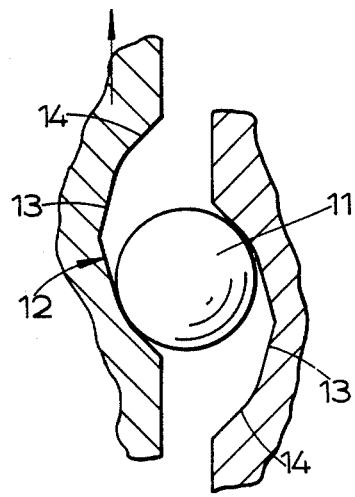
FIG. 4 is a view similar to that of FIG. 3 showing the ball and ramp mechanism in a diferent operative position.

The disc brake illustrated in FIGS. 1 to 4 of the accompanying drawings is of the "dry" type.

The brake is adapted for braking a shaft 1 for transmitting drive to a wheel of a vehicle. The shaft 1 extends axially through a stationary housing 2 which is provided with axially spaced end walls 3 and 4 of annular outline. A rotatable disc 5 provided on opposite faces with linings 6 of friction material is slidably mounted for axial movement on splines 7 on the shaft 1. The disc 5 is located between a braking surface 8, formed on the end wall 3, and a generally annular pressure plate 10.

Balls or rollers 11 are located in complementary inclined recesses 12 in adjacent faces of the pressure plate 10 and the end wall 4. As shown in detail in FIGS. 3 and 4, the edges of the recesses 12 define concentrically-arranged inner and outer ramp surfaces 13 and 14 respectively, with the surfaces 14 being of greater slope than the surfaces 13.

Pilot pins 15 and 16, engage with lugs 17 on the pressure plate 10 to constrain the plate 10 against angular movement, with the pins 15 being disposed to engage with further lugs 18 on the plate 10 to limit the extent to which the plate 10 can move in a radial direction.

In a modification the pins 15 and 16 can be replaced by lugs.

The brake mechanism also includes an hydraulic cylinder 19 which is open at both ends and has an outwardly extending annular flange 20 at one of the ends. The housing 2 is formed with a peripheral opening 21 surrounded by a seating 22 for the flange 20, and the cylinder 19 is secured to the housing 2 by means of bolts 23 which extend through the flange 20 and the seating 22. The axis of the cylinder 19 is substantially at right angles to that of the brake.

The cylinder 19 has a stepped bore 24 in which works a hollow annular stepped piston 25 sealed by seals 26. The working space of the cylinder 19 is the annular space 27 around the piston 25 at the step in diameter and a connection (not shown) is made to this space from a master cylinder or other source of fluid under pressure. Both ends of the cylinder 19 are sealed against the ingress of water or other foreign matter by flexible boots 28 and 29.

In the inoperative retracted position shown in the drawings a shoulder 30 at the step in diameter of the piston 25 engages with a complementary shoulder 31 in the cylinder 19.

Seating on the outer end of the piston 25 is a nut 32, the outer face of which engages with an adjacent face of a lock nut 33. A pull-rod 34 extends with clearance through the hollow piston 25 and is in screw-threaded engagement with the nut 32 and lock nut 33.

The pull-rod 34 extends inwardly through the flexible boot 28, and is coupled at its inner end to a clevis 35 which, in turn, is connected to the pressure plate 10 by means of a pin 36.

The pull-rod 34 also extends outwardly for a distance beyond the lock nut 33 to be slidably received in a trunnion mounted block 37. Outward of the trunnion mounted block 37 the rod 34 is in screw threaded engagement with a nut 38 and a lock nut 39.

The block 37 is pivotally connected between inner ends of a bifurcated bell crank lever 40. The lever 40 is pivoted at an intermediate point in the length on a fulcrum 41 and is connected at its outer ends to a transmission line (not shown), suitably a rod or cable which leads to a hand brake-applying lever.

The brake thus incorporates a mechanical actuator which is of simple, cheap and compact form.

When the brake is to be applied hydraulically for normal service braking, hydraulic fluid under pressure is introduced into the annular space 27 to urge the piston 25 in an outwardly direction with respect to the cylinder 19. This transmits a thrust to the nut 32 and lock nut 33, applying a tensile force to the pull-rod 34 which moves in unison with the piston 25 to move the pressure plate 10 radially with respect to the end wall 4.

The radial movement of the plate 10 causes the balls or rollers 11 to tend to ride out of the recesses 12 to urge the plate 10 and the end wall 4 relatively apart in an axial direction. This urges the disc 5 into engagement with the braking surface 8 to apply the brake.

Since the pressure plate 10 is constrained against angular movement by the pilot pins 15 and 16, no servo effect takes place. In addition, the problem of circumferenatial movement of the pull-rod through the piston, which arises in many known disc brakes of the kind set forth, is eliminated, so that a complicated coupling between the pull-rod 34 and the piston 25 is not necessary.

As wear of the friction linings 6 progresses the balls 11 must ride further up the ramp surfaces 13 and 14 defined by the edges of the recesses 12 in order to produce a given braking force, and thus the pressure plate 10 must move further in the radial direction.

Since the outer ramp surfaces 14 are of greater slope than the inner surfaces 13, the input effort required to produce a given braking force increases noticeably at the fully worn lining condition, thereby providing a wear warning device for the driver.

The pilot pins 15 limit the extent to which the plate 10 can move in the radial direction, providing a simple, cheap and effective wear stop to safeguard the various brake components, the pins 15 being so positioned that they engage with the lugs 18 on the plate 10 to limit the radial motion only after the wear warning device has functioned.

When the brake is released the friction members of the brake assume a retracted position which, in turn, determines the degree to which the piston 25 is retracted towards its fully retracted position with the shoulders 30 and 31 in engagement. The piston 25 is held in the retracted position so determined by friction in the seals 26, thereby acting as an automatic slack adjuster to maintain the braking clearances at a substantially constant value when the brake is applied hydraulically, compensating for wear of the friction linings 6.

The nut 32, together with the lock nut 33, can be screwed further onto the pull-rod 34 to increase the degree to which the piston 25 is retracted when the brake is released, thereby altering or re-setting the braking clearances. This facility, together with the fact that the hydraulic cylinder 19 is external to the main body of the housing 2, enables the brake to be operated by a cheap and compact small bore master cylinder.

In addition, the thrust exerted by the nut 32 on the piston 25 counteracts the tendency of the piston 25 to move about and rattle when the brake is de-energised.

Distancing the hydraulic cylinder 19 from the braking surfaces also enables the problem of thermal expansion of the hydraulic fluid, that is "the rising pedal condition", to be eliminated.

Also, since the cylinder 19 is readily detachable from its seating 22 on the housing 2, it is readily accessible for servicing without major disassembly of the brake.

When the brake is to be applied mechanically, or manually, for parking or in an emergency, the bell crank lever 40 is pivoted about the fulcrum 41 by a force applied to the outer ends of the lever 40 through the transmission line. The pivotal movement of the lever 40 withdraws the pull-rod 34 from the housing 2 to produce radial movement of the pressure plate 10 to actuate the brake as described above. When this occurs the nut 32 and lock nut 33 travel in unison with the pull-rod 34, the nut 32 becoming separated from the piston 25 which is unaffected by the motion.

Wear in the friction linings 6 results in the pull-rod 34 taking up an extended position which becomes more pronounced as the wear progresses, however, this can be compensated for by screwing the nut 38 and lock nut 39 further onto the rod 34 to shorten its effective length.

To facilitate brake operation the recesses 12 are lined with, or are otherwise provided with inserts of, a low friction material.

Figure 5:
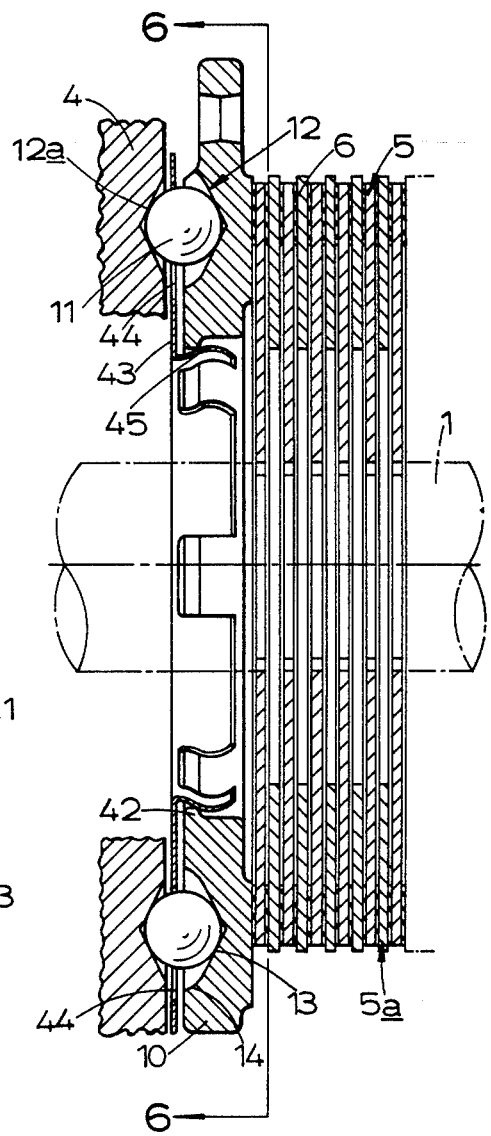
FIG. 5 is a longitudinal section through another disc brake taken on line 5—5 of FIG. 6.
Figure 6:
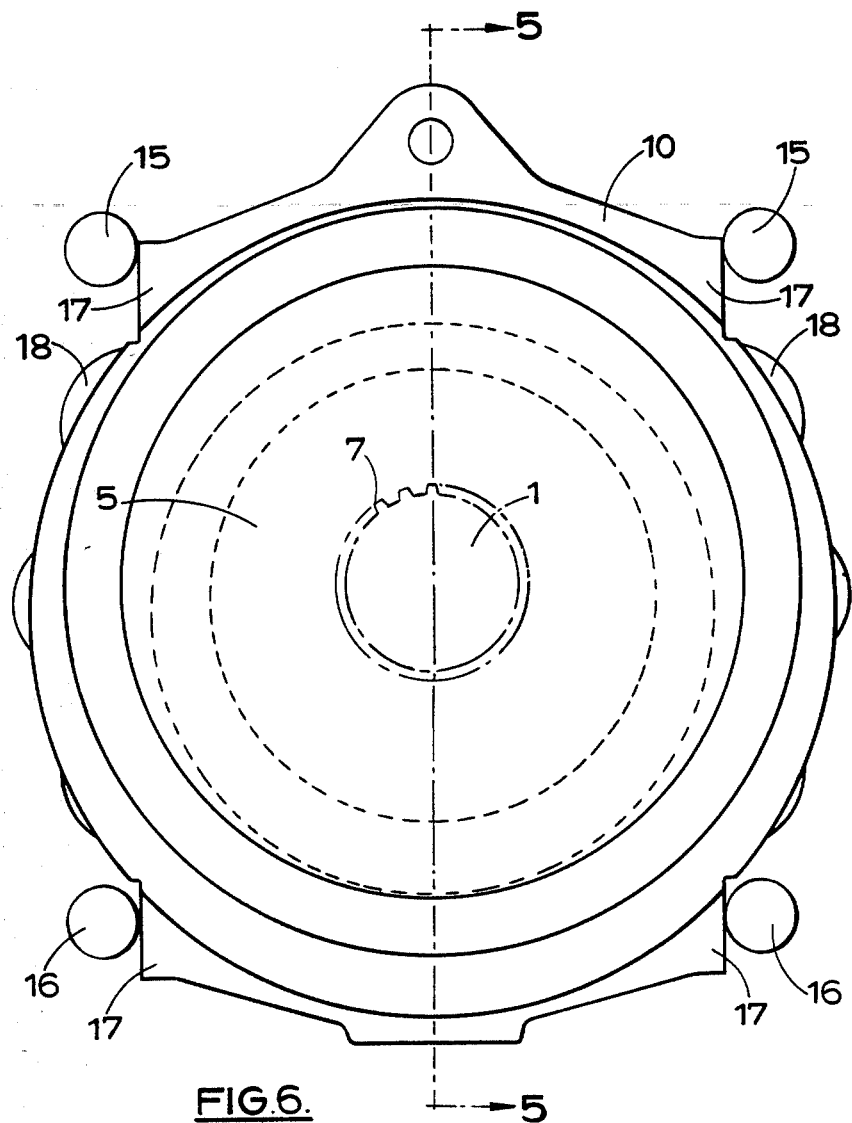
FIG. 6 is a section on the line 6—6 of FIG. 5.
Figure 7:
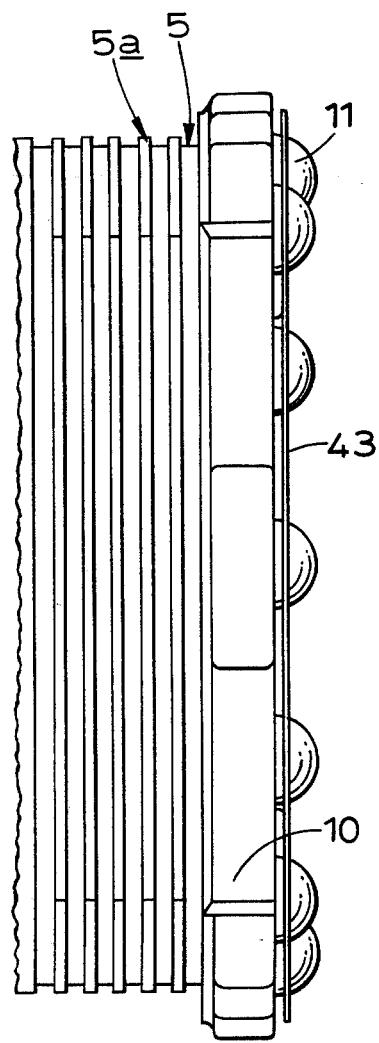
FIG. 7 is a side view of the brake of FIGS. 5 and 6.
Figure 8:
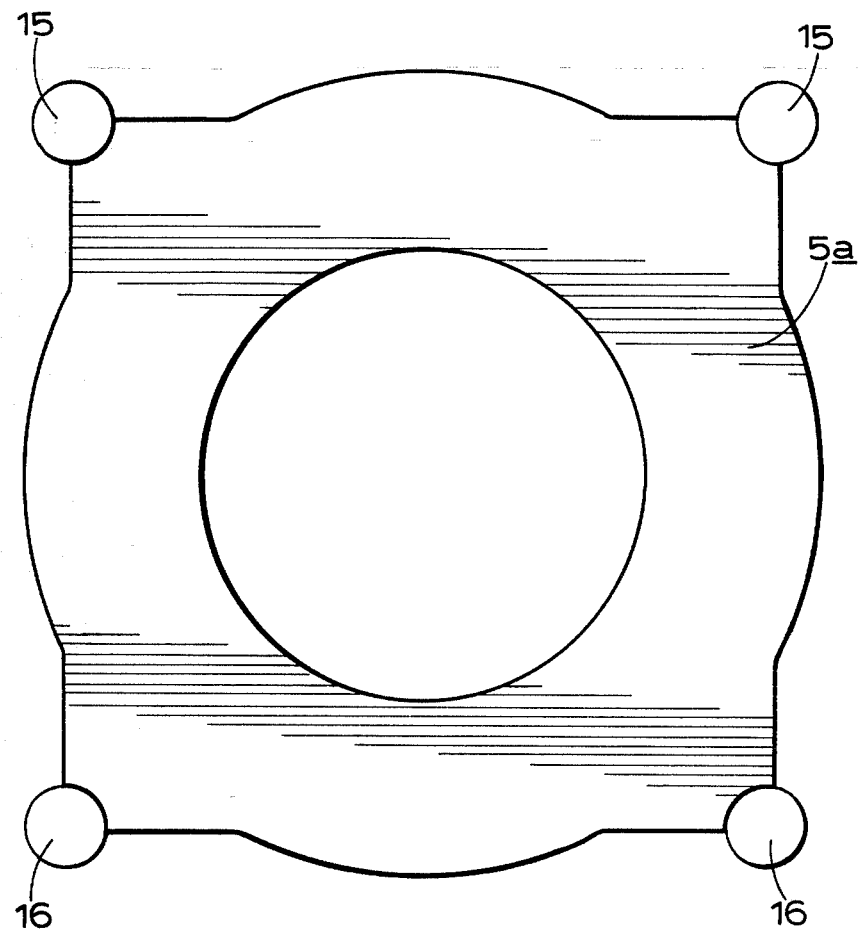
FIG. 8 is a plan of an intermediate disc as incorporated in the brake of FIGS. 5 to 7.
Figure 9:
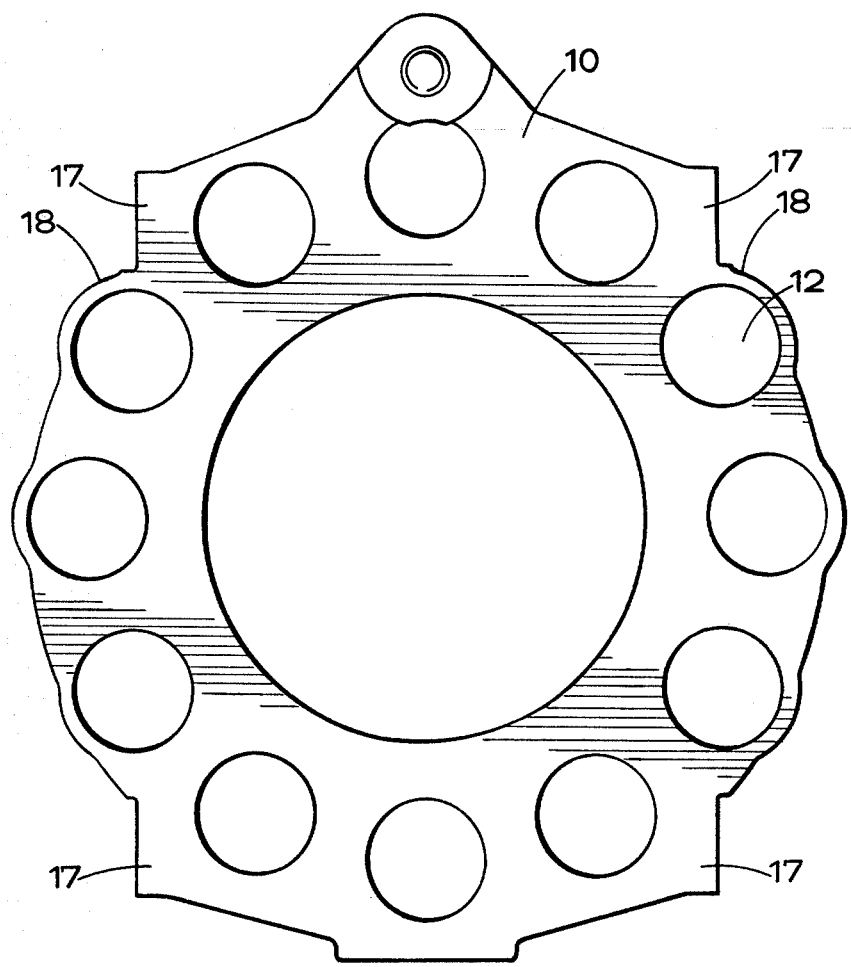
FIG. 9 is a plan of the pressure plate incorporated in the brake of FIGS. 5 to 8.

The modified brake illustrated in FIGS. 5 to 9 is of the "oil-immersed" type, however, its construction and operation is substantially the same as that of FIGS. 1 to 4, and corresponding parts have been given corresponding reference numerals.

In this embodiment a plurality of rotatable axially-movable friction discs 5 are interposed in a stack with intermediate discs 5a which are axially movable but are constrained against angular and radial movement by engagement with pilot pins 15 and 16.

The discs 5 and 5a are located between a relatively stationary braking surface (not shown) and a generally annular pressure plate 10.

The face of the pressure plate 10 which is remote from the discs 5 and 5a includes a number of inclined recesses 12, the edges of which define inner and outer ramp surfaces 13 and 14 respectively, the outer ramp surfaces 14 being steeper than the inner surfaces 13. Also at the end of the plate 10 remote from the discs 5 and 5a is an annular flange 42 which extends radially inwards.

The pilot pins 15 and 16 constraining the intermediate discs 5a also constrain the pressure plate 10 against angular movement and limit the extent to which the plate 10 can move in a radial direction, as described in the case of the first embodiment.

The brake incorporates a reaction member 4 which includes a number of conical recesses 12a, facing and in alignment with the recesses 12.

A cage 43 of annular outline is disposed between the pressure plate 10 and the reaction member 4. The cage 43 includes a number of radially drawn or elongate holes 44 and has a curved lip 45 on its inner periphery, and is secured to the the pressure plate 10 by the engagement of the lip 45 with the flange 42 such that the holes 44 and the recesses 12 and 12a are in alignment.

Balls or rollers 11 are trapped within the recesses 12 by the cage 43 but, due to the shape and arrangement of the holes 44, are permitted unrestricted movement in the direction of the radial movement of the plate 10 during operation of the brake.

The cage 43 thereby prevents the balls 11 from dropping out of the recesses 12 during assembly or disassembly of the brake, for ease of installation and servicing, but does not interfere with the operation of the brake.

The construction and operation of this brake is otherwise the same as that of FIGS. 1 to 4. Isolating the hydraulic cylinder from the braking surfaces provides the additional advantage that conventional brake actuating fluids can be used without risk of contaminating the transmission fluid and vice versa.

In a modification of the constructions described above radial movement of the plate 10 to apply the brake can be achieved by omitting the pull-rod 34, and applying a radial thrust to the opposite edge of the plate 10.

Also a drive-ring slack adjuster of known type may be incorporated in the hydraulic cylinder 19 to compensate automatically for wear of the friction linings 6.

We claim:

1. A disc brake for vehicles comprising a stationary housing having a relatively stationary surface, at least one friction disc having a braking face of annular outline and a peripheral edge, said disc being rotatable within said stationary housing and adapted to be moved axially into engagement with said relatively stationary surface, and actuating means for moving said friction disc into engagement with said surface to apply said brake, said actuating means comprising at least one pressure plate superimposed upon said braking face and having spaced side edges located outside said peripheral edge of said disc, a non-rotatable reaction member, and camming means co-operating with said pressure plate and said reaction member, movement of said pressure plate in a radial direction relative to said reaction member causing a camming effect to be produced so that said pressure plate moves axially to urge said friction disc into engagement with said surface, means for producing said movement in said radial direction, and further means for constraining said pressure plate against angular movement, said further means comprising means rigid with said housing defining first parallel guide surfaces located outside said peripheral edge of said disc, and second parallel guide surfaces on said side edges of said pressure plate for slidable engagement with said first guide surfaces, said engagement between said first and second guide surfaces being so constructed and arranged as to positively guide said pressure plate for total bodily movement in said radial direction in response to operation of said means for providing said movement in a radial direction, to prevent angular movement of said pressure plate with respect to said reaction member, but to permit movement of said pressure plate in an axial direction with respect to said reaction member at the same time as said pressure plate is being moved in said radial direction.

2. A disc brake as claimed in claim 1, wherein said camming means comprises balls or rollers located in complementary sets of recesses in adjacent faces of said pressure plate and said reaction member.

3. A disc brake as claimed in claim 2, wherein edges of said recesses comprise ramp surfaces, and said recesses each comprise an inner and an outer ramp surface, concentrically arranged, said outer ramp surface being of greater slope than said inner ramp surface.

4. A disc brake as claimed in claim 2, wherein said balls or rollers are trapped within one of said sets of said recesses by means of a cage, said balls or rollers projecting through holes in said cage, said holes being so constructed and arranged as to allow said balls or rollers unrestricted movement in said direction of said movement in a radial direction of said pressure plate during operation of said brake.

5. A disc brake as claimed in claim 4, wherein said cage is fixed to said pressure plate to trap said balls or rollers in said recesses in said pressure plate.

6. A disc brake as claimed in claim 1, wherein said reaction member comprises an end wall of said housing.

7. A disc brake as claimed in claim 1, wherein lugs are provided on said pressure plate, said first parallel guide surfaces comprise pilot pins aligned with the direction of said movement in a radial direction and said second parallel guide surfaces comprise edges provided on said lugs.

8. A disc brake as claimed in claim 7, wherein shoulders are provided on said pressure plate, said shoulders being engagable with said pilot pins to limit the extent to which said pressure plate can move in said radial direction.

9. A disc brake as claimed in claim 7, wherein a plurality of rotatable axially movable friction discs are provided, non-rotatable axially movable friction discs are also provided, said rotatable friction discs are interposed in a stack with said non-rotatable friction discs, and said non-rotatable friction discs are constrained against angular and radial movement by means of said pilot pins.

10. A disc brake as claimed in claim 1, wherein said means for producing said radial movement comprises a pull-rod, said pull-rod being connected to said pressure plate, and said pull-rod can be pulled to produce said movement in a radial direction.

11. A disc brake as claimed in claim 1, wherein an hydraulic piston and cylinder assembly is provided for actuating said means for producing said movement in a radial direction for normal service braking and a suitable mechanical linkage is provided for actuating said means for producing said movement in a radial direction for parking or emergency braking.

12. A disc brake as claimed in claim 1, wherein a plurality of rotatable axially movable friction discs are provided, non-rotatable axially movable friction discs are also provided, and said rotatable friction discs are interposed in a stack with said non-rotatable friction discs.

* * * * *